Jan. 20, 1931. L. E. BERGSTROM 1,789,509
FISHING ROD HOLDER
Filed June 8, 1928 2 Sheets-Sheet 1

Inventor
L. E. Bergstrom

By Clarence A. O'Brien
Attorney

Jan. 20, 1931.  L. E. BERGSTROM  1,789,509
FISHING ROD HOLDER
Filed June 8, 1928   2 Sheets-Sheet 2
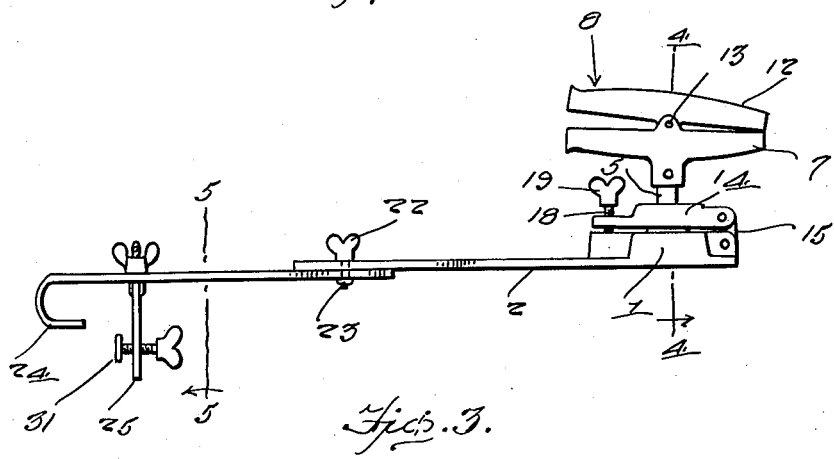
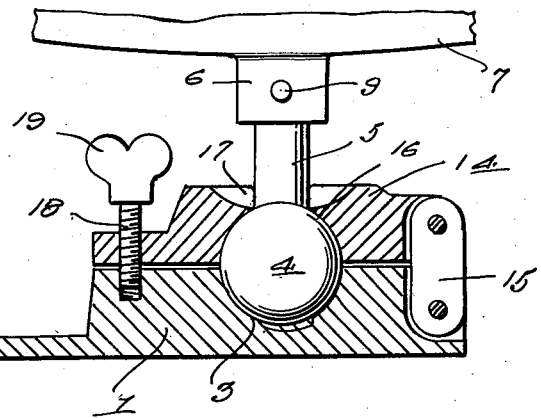
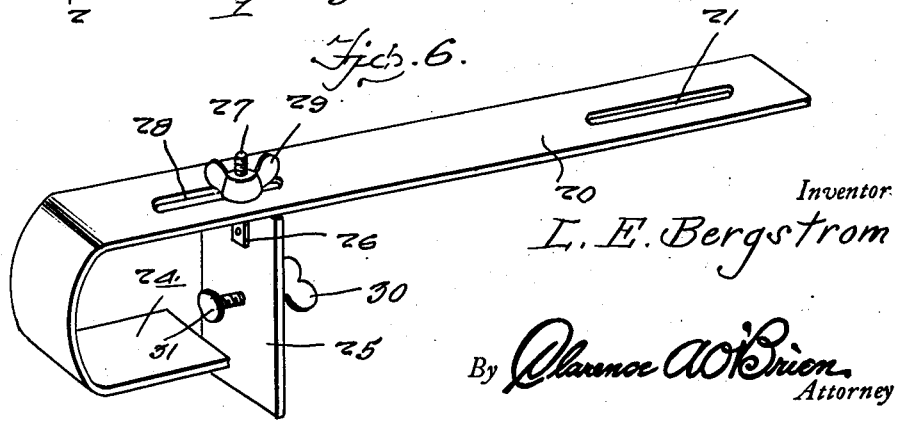
Inventor
L. E. Bergstrom
By Clarence A. O'Brien
Attorney Patented Jan. 20, 1931

1,789,509

UNITED STATES PATENT OFFICE

LOUIS E. BERGSTROM, OF NEENAH, WISCONSIN

FISHING-ROD HOLDER

Application filed June 8, 1928. Serial No. 283,818.

The present invention relates to improvements in fishing rod holders, and has for its principal object to provide a device that is particularly adapted to be clamped on the upper edge of the side of the boat, the support for the fishing rod being capable of universal movement, means being provided for securing the fishing rod holder in any adjusted position.

A further object is to provide a fishing rod holder of the above mentioned character which will hold the rod while the line and bait are in the water, thus relieving the fisherman of the labor of supporting the line and enabling him to operate the boat, and at the same time observe from a distance the line and pole.

A further object is to provide a fishing rod holder of the above mentioned character which includes a pair of coacting clamping jaws for receiving the handle of the fishing rod, the mouth end of the jaws being normally open and spread apart, but being moved to an operative position for engagement with the handle of the fishing rod when the handle is forced rearwardly into the jaws.

Still a further object is to provide a fishing rod holder that may be readily and easily attached or detached from the boat, the same being further simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts throughout the several views:

Figure 2 is a side elevation of the fishing rod holder per se.

Figure 3 is an enlarged detail showing the ball and socket connection between the base and the shank on which the stationary jaw of the handle clamping member is mounted, and also showing the block that is hingedly connected at one end to the adjacent end of the base and is formed with an opening to accommodate the shank and the ball shaped head formed on the lower end thereof, the securing means for the other end of the block being disposed.

Figure 4:
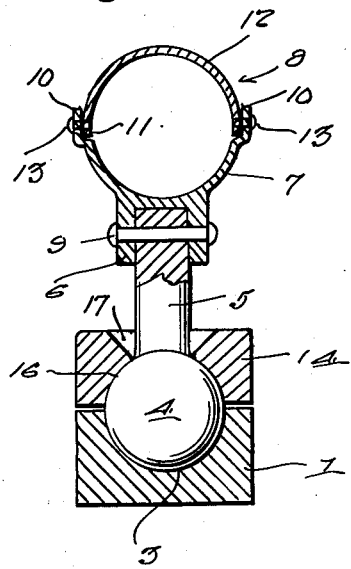

Figure 4 is a vertical sectional view taken approximately on the line 4—4 of Figure 2 looking in the direction of the arrows.

Figure 5:
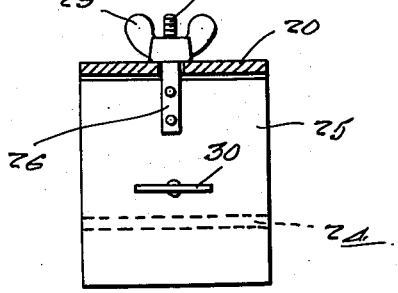

Figure 5 is a similar section taken on the line 5—5 of Figure 2 looking in the direction of the arrows, and Figure 6 is a detail perspective view of the attaching bracket for the fishing rod holder to secure the same on the upper edge of one side of the boat.

In the drawings wherein for the purpose of illustration is shown the preferred embodiment of my invention, the numeral 1 designates a relatively thick base that has extending from the forward end thereof the narrow elongated arm 2, the purpose of which will be presently described. Formed in the top of this base at the central portion thereof is the semi-circular cavity 3 for receiving the lower half of the ball shaped head 4 formed on the lower end of a vertical shank 5, the upper end of said shank being secured within a socket 6 formed on the bottom of the intermediate portion of the lower stationary section 7 of the handle clamping unit designated generally by the numeral 8. The securing means for the upper end of the shank 5 is shown at 9 in Figure 4.

The lower section 7 of the handle clamping unit is substantially semi-circular in cross section and is disposed substantially horizontal. A pair of upstanding ears 10 are formed on the upper edges of the intermediate portion of the section 7 for cooperation with similar ears 11 formed at the intermediate portion of the semi-circular upper section 12 and pivot pins 13 extend through the respective pairs of ears whereby the upper section is pivotally associated with the lower section, and in such a manner that the forward ends of the jaw forming sections are normally spaced apart while the rear ends are in abutting relation as suggested in Figure 2. The forward ends of the stationary and movable jaw sections may be slightly flared outwardly to form a mouth to permit the ready and easy insertion of the handle of the fishing rod, and since the rear end of the upper section 8 is inclined rearwardly of the pivot the rear end of the handle clamping socket will be tapered so that as the handle of the fishing rod is inserted and pressed back to the rear of the clamp, it spreads apart the rear ends of the two jaws of the clamp thereby forcing the forward ends of the clamping jaw together, hence, the further the fishing rod is inserted into the clamp, the more firmly does the front part of the clamp grip the handle of the rod. The grip or handle of fishing rods are generally standardized as to size and shape and the present device is designed so as to permit the handle of a fishing rod to be properly inserted therein so that it will be firmly and securely gripped.

Disposed above the base 1 is the block 14, the rear end of this block being pivotally connected to the inner or rear end of the base 1 by means of the link 15 as shown very clearly in Figure 3, and the intermediate portion of the block is relatively thick and is formed in its bottom face with the substantially semi-circular cavity 16 for receiving the upper half of the ball shaped head 4 formed on the lower end of the shaft 5. An elongated recess 17 is formed in the upper face of the intermediate portion of the block 14, and this recess has its sides flared as suggested in Figures 3 and 4. Furthermore the recess 17 communicates with the semi-circular cavity 16 to permit the shank 5 to extend through the top of the block.

The attaching bracket associated with the fishing rod holder comprises an elongated flat strip of metal 20 that is formed with a longitudinal slot 21 in its inner end and the outer end of the arm 2 overlaps the inner end of the strip 20 and a thumb screw 22 extends through an opening formed in the outer end of the arm and through the slot 21 and a nut 23 is threaded on the lower end of the thumb screw to secure the parts in adjustably connected manner. The outer end of this strip is bent to form a hook 24 that engages over the upper edge of the side of the bolt A and cooperating with the hook 24 is the vertically disposed clamping plate 25 that engages with the inner face of the upper edge portion of the bolt. This plate 25 carries at its upper edge an inverted U-shaped bracket 26 and extending upwardly from the crown portion of the bracket is the threaded stem 27, the same being disposed through a longitudinal slot 28 formed in the outer end portion of the strip 20 inwardly of the hook 24, and a thumb nut 29 is threaded on this stem 27 to secure the plate 25 in any adjusted position with respect to the hook 24. A further securing means for the bracket comprises a thumb screw 30 that is threaded through an opening formed in the intermediate portion of the plate 25. A head 31 is detachably carried by the inner threaded end of the thumb screw to prevent damage to the side of the boat when the present device is attached.

Figure 1:
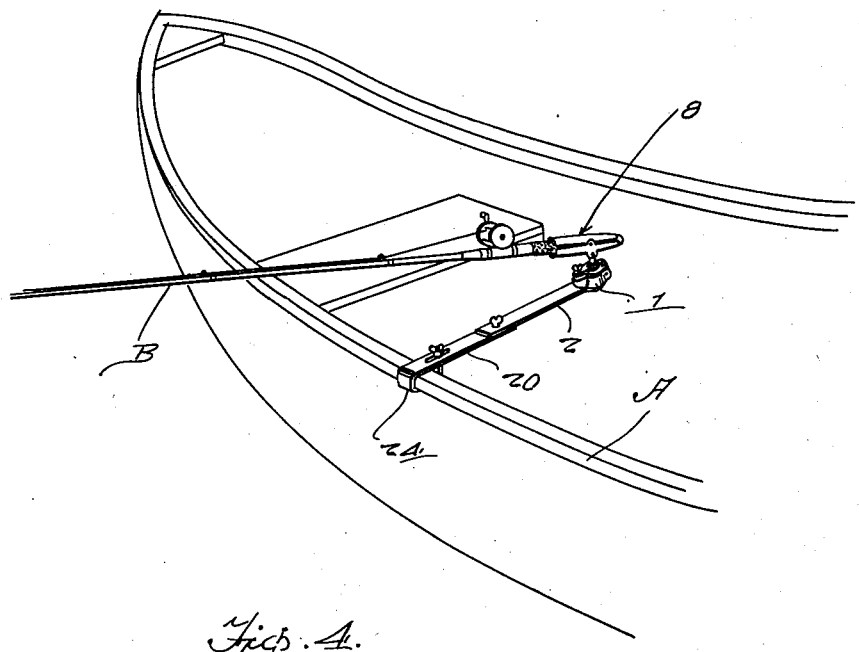
Figure 1 is a detail perspective view of the fishing rod holder embodying my invention, showing the manner in which the same is supported on the upper edge of the side of a row boat.

When the parts are assembled in the manner shown in Figure 1, it will be observed that the handle of the fishing rod B will be secured in the clamping unit 8, while the outer end of the rod will extend outwardly beyond the side of the boat together with the fishing line. Thus the line and its attachment are supported and the fisherman may retire and await results, the indications of which will be apparent by the movement of the fishing line of cork, if one is used.

When a strike is made, the rod is moved from the holder and the fish is caught in the usual manner, after which the rod may be rebaited and reset.

The provision of a fishing rod holder will enable the same to be positioned at any desired angle, and furthermore due to its simplicity, the parts may be readily and easily adjusted and attached or detached.

By pivotally securing the outer end of the arm 2 on the inner end of the bracket 20, said arm can be swung to a point adjacent the side of the boat so as to be substantially parallel therewith, and thus be entirely out of the way.

While I have shown the preferred embodiment of my invention, it is to be understood that minor changes in the size, shape and arrangement of parts may be resorted to without departing from the spirit of the invention or the scope of the appended claims.

Having thus described the invention, what I claim as new and desire to secure by Letters Patent is:—

1. A fishing rod holder comprising a pair of longitudinally adjustable bracket arms, one of said arms having a clamping socket at its extreme outer end, the other arm having its extreme outer end bent downwardly to form a hook for engagement over the outer side edge of a boat, a fishing rod handle clamping unit adjustably engaged in the said clamping socket, and an adjustable clamping plate carried by the hook bearing arm for cooperation with the said hook.

2. In combination, a pair of bracket arms, means for securing said arms at one end, whereby said arms may be longitudinally and angularly adjusted relative to one another, one of said arms at its free end provided with a support engaging clamp, and a fishing rod handle clamping unit having universal connection with the free end of the other of said arms.

In testimony whereof I affix my signature.

LOUIS E. BERGSTROM.